(12) United States Patent
Choi et al.

(10) Patent No.: US 8,089,332 B2
(45) Date of Patent: Jan. 3, 2012

(54) SUPERCONDUCTING POWER TRANSFORMING APPARATUS

(75) Inventors: Kyeong-Dal Choi, Seoul (KR); Ji-Kwang Lee, Wanju-gun (KR); Woo-Seok Kim, Seoul (KR); Chan Park, Seoul (KR); Sun-Bok Choi, Incheon (KR)

(73) Assignee: Korea Polytechnic University Industry Academic Cooperation Foundation, Sheung-si (KR)

( * ) Notice: Subject to any disclaimer, the term of this patent is extended or adjusted under 35 U.S.C. 154(b) by 134 days.

(21) Appl. No.: 12/679,697

(22) PCT Filed: Nov. 19, 2009

(86) PCT No.: PCT/KR2009/006818
§ 371 (c)(1),
(2), (4) Date: Mar. 24, 2010

(87) PCT Pub. No.: WO2010/110524
PCT Pub. Date: Sep. 30, 2010

(65) Prior Publication Data
US 2011/0218110 A1 Sep. 8, 2011

(30) Foreign Application Priority Data
Mar. 27, 2009 (KR) .................. 10-2009-0026446
Mar. 27, 2009 (KR) .................. 10-2009-0026447

(51) Int. Cl.
*H01F 27/02* (2006.01)
(52) U.S. Cl. ........................................ 336/90
(58) Field of Classification Search .............. 336/55–62, 336/DIG. 1, 90, 92, 94; 62/51.1; 505/211, 505/870; 335/216; 361/19, 141; 323/355, 323/360
See application file for complete search history.

(56) References Cited

U.S. PATENT DOCUMENTS

| 5,107,240 | A | * | 4/1992 | Tashiro et al. | 336/60 |
| 5,250,508 | A | * | 10/1993 | Pham | 505/211 |
| 6,324,851 | B1 | * | 12/2001 | Szasz et al. | 62/51.1 |
| 6,822,363 | B2 | * | 11/2004 | Leijon | 310/196 |
| 6,940,380 | B1 | * | 9/2005 | Leijon | 336/60 |

* cited by examiner

*Primary Examiner* — Tuyen Nguyen
(74) *Attorney, Agent, or Firm* — NSIP Law

(57) ABSTRACT

The present invention relates to a superconducting power transforming apparatus. The superconducting power transforming apparatus according to the present invention comprises a transformer housing having a transforming cable passing hole and filled with a liquid cooling means; a superconducting transformer housed in the transformer housing in a state that the superconducting transformer is immersed in the liquid cooling means; a tap changer housing having a tap changing cable passing hole and vacuum-sealed from outside; a power tap changer housed in the vacuum tap changer housing; and a cable linking pipe vacuum-sealed from the transformer housing and the tap changer housing, and linking the transforming cable passing hole with the tap changing passing hole in order that a transformer winding tap cable connecting the superconducting transformer and the power tap changer passes through. Consequently, it is possible to guarantee stable operation of a superconducting transformer which works at an extremely low temperature and a power tap changer as like On-Load Tap Changer which works at low temperature.

16 Claims, 3 Drawing Sheets

【FIG. 1】
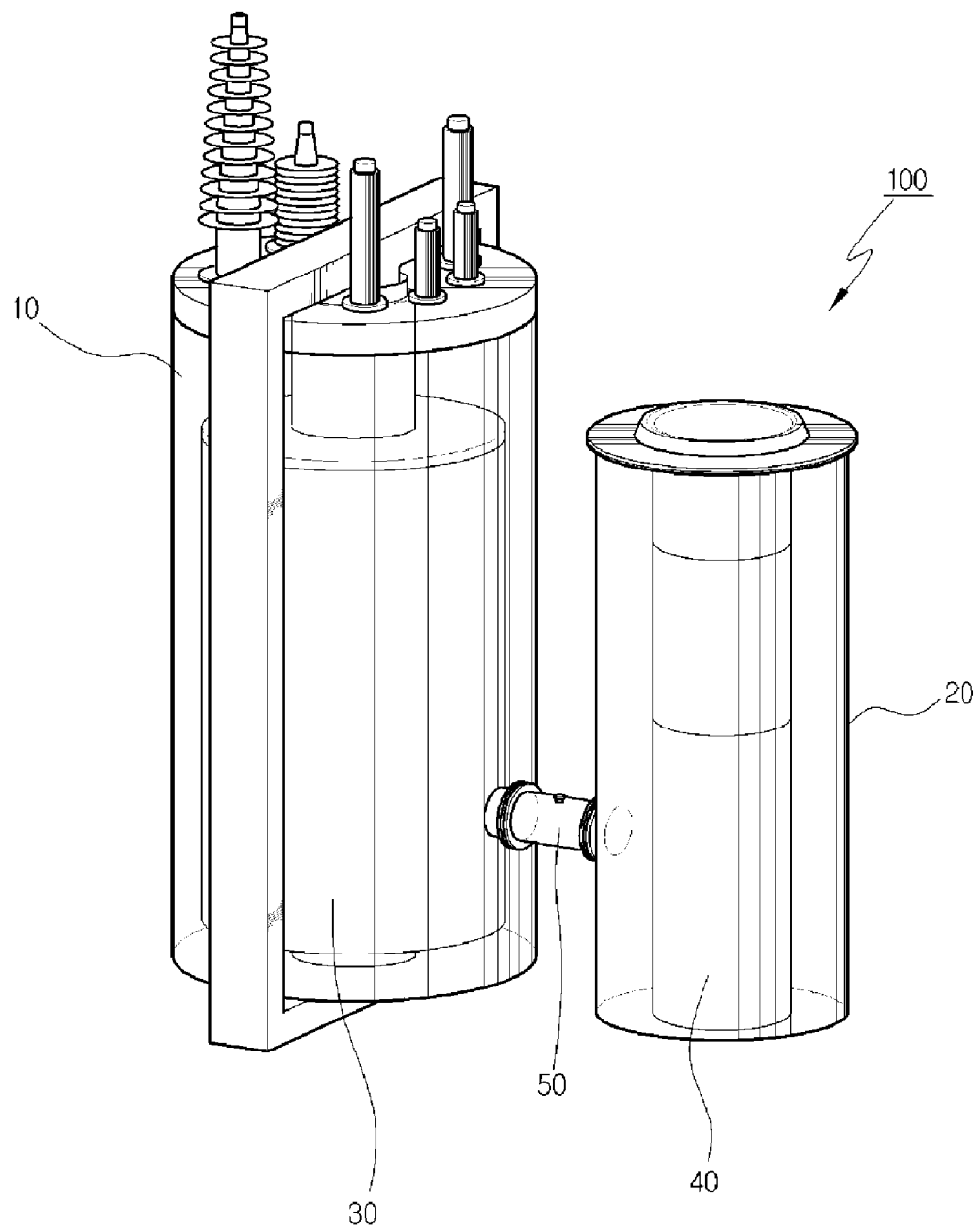

【FIG.2】
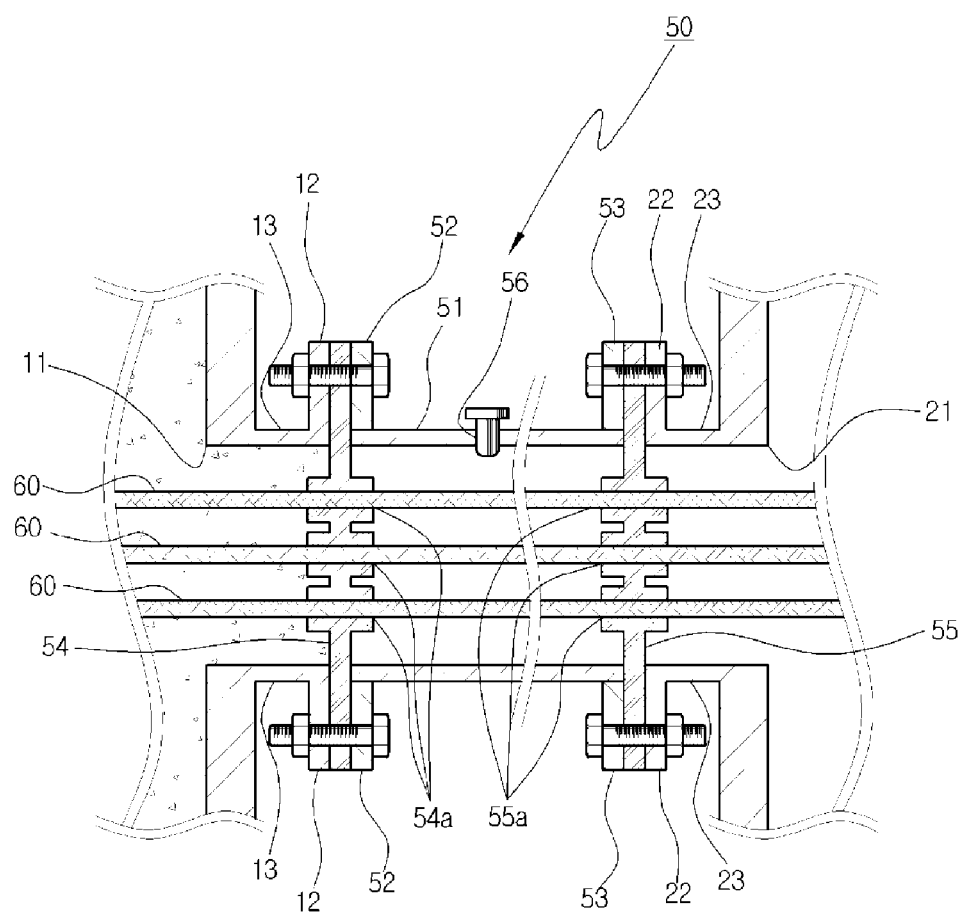

[FIG. 3]
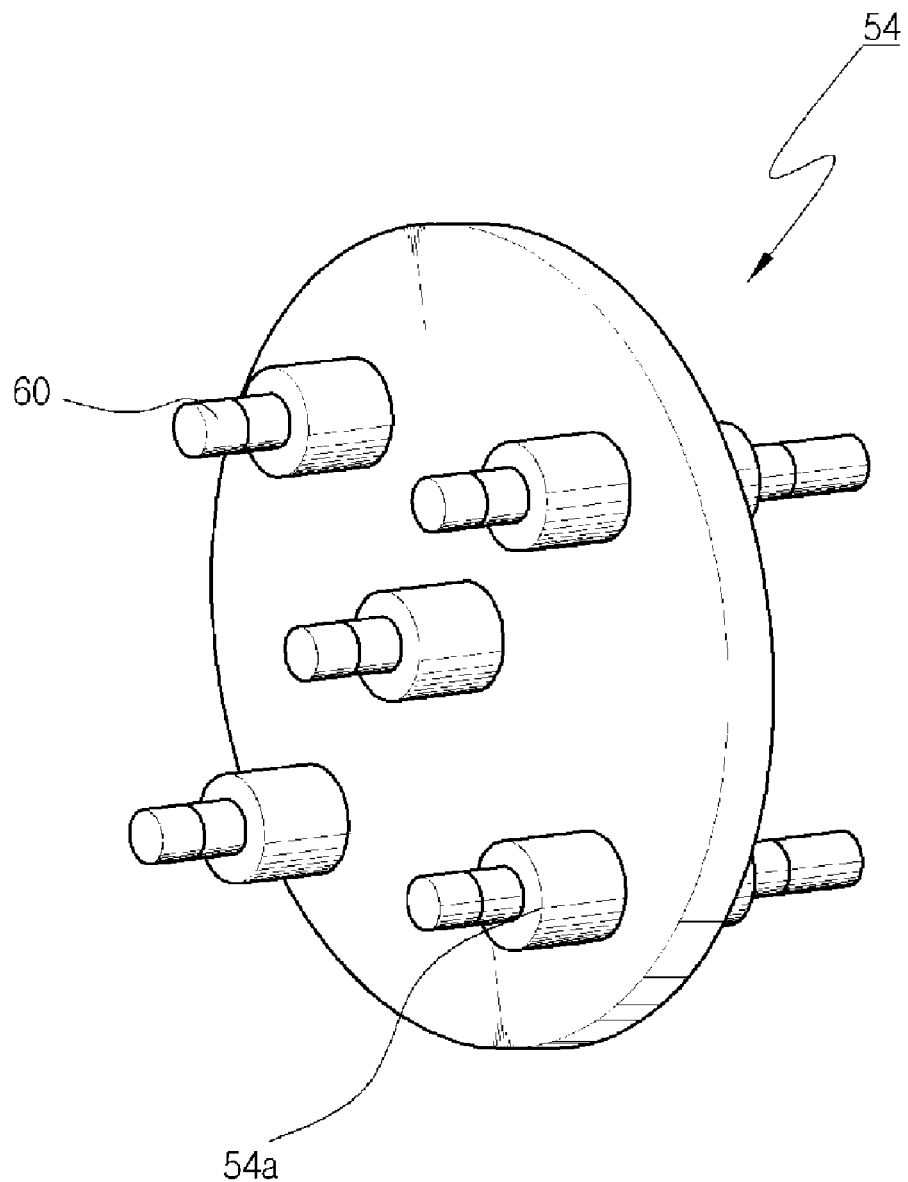

SUPERCONDUCTING POWER TRANSFORMING APPARATUS

TECHNICAL FIELD

The present invention relates to a superconducting power transforming apparatus, and more particularly to the superconducting power transforming apparatus for guaranteeing stable operation of a superconducting transformer which works at an extremely low temperature and a power tap changer such as On-Load Tap Changer which works at low temperature or in an insulating oil.

BACKGROUND ART

Generally, a transformer is a device that changes AC voltage or DC voltage using the effect of electro-magnetic induction. A power transformer connected to a usual power transmission and distribution line comprises a primary winding connected to a power supply and a secondary winding connected to a load, and changes a voltage to a higher or lower voltage without changing a power.

And, various researches have been conducted on the development of the superconducting power device without resistance loss, since a superconductor had been developed. The development of the high temperature superconductor (HTS) overcoming the limitation of the low temperature superconductor which can work at an extremely low temperature has accelerated the research for the practical use of the superconducting power device, and the research for the practical use of the superconducting transformer using a superconductor (hereinafter, "the superconducting power transforming apparatus") has been continued.

The superconducting power transforming apparatus has the merit of being small, light, highly efficient, environment-friendly and overload-resistant by comparison with usual transformer.

At an early stage of researches about the superconducting power transforming apparatus, it was recognized as a principal merit of the superconducting power transforming apparatus to enable to save energy and reduce costs for operation by high efficiency.

However, recently, it is recognized as more principal merit to enable to reduce its weight and size.

A standard capacity of 3-phase 154 kV class transformer in general use is 60MVA, and that is installed and operated at a basement of a building in large cities.

As a load is increasing in the near future, the size of the existing transformer using a cooper cable will increase as a consequence of the capacity increase of that. The size increase of a transformer will raise the problem that the existing transformer should be moved to more wide space.

Here, if the superconducting transformer will be substitute for the existing transformer, the limitation of the installation space corresponding to the capacity increase will be solved through reducing its size by half or one third than the existing transformer.

Meanwhile, it is ideal that a secondary voltage (load voltage or low tension) is maintained at a rated voltage in a transformer. But, because a primary voltage is irregular at each installation place and the internal voltage drop of a transformer is changed by the load current intensity and the power factor, the problem occurs that a secondary output voltage is fluctuated too. Therefore, on-load tap changer (OLTC) which adjusts the secondary voltage to the rated voltage by means of the change of turns-ratio is installed and used in the transformer so as to adjust the secondary voltage to the rated voltage for the changing load.

The adjustment of the secondary voltage to the rated voltage is also necessary for the superconducting transformer. Therefore, on-load tap changer (OLTC) which may be applied to the superconducting transformer have to be considered for a practical use of the superconducting transformer.

Generally, the existing transformer and on-load tap changer are installed and operated together while they are immersed in the insulating oil.

However, even though the superconducting transformer is put to practical use, the problem occurs that the installation method of the existing transformer and on-load tap changer can't be applied to the superconducting transformer. Namely, the "high" of the high temperature superconducting transformer just means higher temperature than "low" temperature of the low temperature superconducting transformer. Because the high temperature superconducting transformer even works at extremely low temperature which is much lower than the existing transformer does, the high temperature superconducting transformer can't works in a state that it is immersed in the insulating oil with on-load tap changer together.

DISCLOSURE

Technical Problem

The present invention has been made in view of the above problems, and it is an object of the present invention to provide the superconducting power transforming apparatus enabling a superconducting transformer and a power tap changer to work in a mutually independent operating environment, in order to guarantee stable operation of a superconducting transformer which works at an extremely low temperature and a power tap changer such as On-Load Tap Changer which works at low temperature or in an insulating oil.

Technical Solution

In accordance with an aspect of the present invention, the above objects can be accomplished by the provision of a superconducting power transforming apparatus according to the present invention comprising a transformer housing having a transforming cable passing hole and filled with a liquid cooling means; a superconducting transformer housed in the transformer housing in a state that the superconducting transformer is immersed in the liquid cooling means; a tap changer housing having a tap changing cable passing hole and vacuum-sealed from outside; a power tap changer housed in the vacuum tap changer housing; and a cable linking pipe vacuum-sealed from the transformer housing and the tap changer housing, and linking the transforming cable passing hole with the tap changing passing hole in order that a transformer winding tap cable connecting the superconducting transformer and the power tap changer passes through.

Also, another aspect of the present invention is achieved by providing a superconducting power transforming apparatus comprising a transformer housing having a transforming cable passing hole and filled with a liquid cooling means; a superconducting transformer housed in the transformer housing in a state that the superconducting transformer is immersed in the cooling means; a tap changer housing having a tap changer cable passing hole and filled with a insulating oil; a power tap changer housed in the tap changer housing in a state that the power tap changer is immersed in the insulating oil; and a cable linking pipe vacuum-sealed from the transformer housing and the tap changer housing and linking the transforming cable passing hole with the tap changing passing hole in order that a transformer winding tap cable connecting the superconducting transformer and the power tap changer can pass through.

Here, the superconducting transformer is provided with a type of a high temperature superconducting transformer; and the liquid cooling means are provided with liquid nitrogen.

Also, the power tap changer may be provided with a type of an On-Load Tab Changer (OLCT).

Here, the superconducting power transforming apparatus further comprises a transforming coupling part coupled with the cable linking pipe and provided on the transforming cable passing hole of the transformer housing; and a tap changing coupling part coupled with the cable linking pipe and provided on the tap changing cable passing hole of the tap changer housing. Also, the cable linking pipe comprises a cylindrical linking pipe main body, a transforming connecting part provided on the one side of the linking pipe main body and sealingly coupled with the transforming coupling part, and a tap changing connecting part provided on the other side of the linking pipe main body and sealingly coupled with the tap changing coupling part.

And, the superconducting power transforming apparatus further comprises a transforming sealing wall installed between the transforming coupling part and the transforming connecting part, sealing the transformer housing and the cable linking pipe and having a plurality of a first cable passing holes where the transformer winding tap cable passes; and a tap changing sealing wall installed between the tap changing coupling part and the tap changing connecting part, sealing the tap changer housing and the cable linking pipe, and having a plurality of a second cable passing holes where the transformer winding tap cable passes.

Here, the plurality of the first cable passing holes is spaced apart from each other at a predetermined distance in order to prevent an insulation breakdown between the transformer winding tap cables passing through each of the first cable passing holes; and the plurality of the second cable passing holes is spaced apart from each other at a predetermined distance in order to prevent an insulation breakdown between the transformer winding tap cables passing through each of the second cable passing holes.

And, the transforming sealing wall and the tap changing sealing wall are provided with epoxy resin.

Also, the cable linking pipe further comprises a pump connecting part connected with a vacuum pump for making an inner of the linking pipe main body vacuous.

ADVANTAGEOUS EFFECTS

According to the present invention, the present invention can provide the superconducting power transforming apparatus enabling a superconducting transformer and a power tap changer to work in a mutually independent operating environment, in order to guarantee stable operation of a superconducting transformer which works at an extremely low temperature and a power tap changer such as On-Load Tap Changer which works at low temperature or in an insulating oil.

DESCRIPTION OF DRAWINGS

FIG. 1 is a view illustrating a constitution of the superconducting power transforming apparatus according to the present invention;

FIG. 2 shows a coupling constitution of the transformer housing, the cable linking pipe and the tap changer housing of the superconducting power transforming apparatus according to the present invention;

FIG. 3 shows a view illustrating a constitution of the transforming sealing wall of the superconducting power transforming apparatus according to the present invention.

BEST MODE FOR INVENTION

The present invention relates to a superconducting power transforming apparatus comprising a transformer housing having a transforming cable passing hole and filled with a liquid cooling means; a superconducting transformer housed in the transformer housing in a state that the superconducting transformer is immersed in the cooling means; a tap changer housing having a tap changing cable passing hole and vacuum-sealed form outside; a power tap changer housed in the vacuum tap changer housing; a cable linking pipe vacuum-sealed from the transformer housing and the tap changer housing and linking between the transforming cable passing hole and the tap changing passing hole in order that a transformer winding tap cable connecting the superconducting transformer and the power tap changer can pass through.

DETAILED DESCRIPTION

Below, embodiments of the present invention will be described in detail with reference to the annexed drawings.

Referring to FIG. 1, a superconducting power transforming apparatus 100 includes a transformer housing 10, a superconducting transformer 30, a tap changer housing 20, a power tap changer 40 and a cable linking pipe 50.

The superconducting transformer 30 comprises a primary winding connected to a power supply and a secondary winding connected to a load, and uses a superconductor. Here, as an example, a high temperature superconductor (HTS) is used as the superconducting transformer 30 of the present invention.

The transformer housing 10 has a cylindrical shape in order to house the superconducting transformer 30 in. Also, the transforming cable passing hole 11 where the transformer winding tap cable 60 passes is formed on the one side of the transformer housing 10. In this embodiment of the present invention, as shown in FIG. 1, the transforming cable passing hole 11 is formed at the lower part of the transformer housing 10 as an example, and the transforming cable passing hole 11 may be formed at the upper part or the central part according to the position of the transformer winding tap cable 60 connecting the superconducting transformer 30 and the power tap changer 40.

Also, the inner of the transformer housing 10 is filled with a liquid cooling means for maintaining the extremely low temperature during the operation of the superconducting transformer 30. Here, in this embodiment of the present invention, a liquid cooling means filled in the transformer housing 10 are provided with liquid nitrogen as an example, and another cooling means enabling the superconducting transformer 30 to operate may be applied.

Meanwhile, the power tap changer 40 changes the tap connection of the winding of the superconducting transformer 30 for enabling voltage regulation of the output from the superconducting transformer 30 irrespective of fluctuations in load. In this embodiment of the present invention, as an example, an on-load tap changer (OLTC) changing the tap connection of the winding during the superconducting transformer 30 is used as the power tap changer 40, and a non-load tap changer may be used.

The tap changer housing 20 has a cylindrical shape in order to house the power tap changer 40 in. And, the tap changing cable passing hole 21 where the transformer winding tap cable 60 passes is formed on the one side of the tap changer housing 20. Here, the tap changing cable passing hole 21 formed on the tap changer housing 20 is formed at the position corresponding to the transforming cable passing hole 11 in order that the cable linking pipe links the transforming cable passing hole 11 with the tap changing cable passing hole 21.

Also, the insulation environment is made up in the inner of the tap changer housing 20. In this embodiment of the present invention, the inner of the tap changer housing 20 is maintained in vacuum as an example. By means of maintaining the inner of the tap changer housing 20 vacuum, it is possible to make up the low temperature environment as well as the insulation environment.

Here, in order to maintain the insulation environment in the inner of the tap changer housing 20, the insulating oil for cooling the power tap changer 40 may be filled in the tap changer housing 20. And, it is desirable to use the material which has a high flashing point, a low freezing point, a high fluidity, a high specific heat, and which doesn't form the extract or isn't oxidized at a low temperature.

The cable linking pipe 50 links the transforming cable passing hole 11 of the transformer housing 10 with the tap changing cable passing hole 21 of the tap changer housing 20, in order that the transformer winding tap cable 60 connecting superconducting transformer 30 and the power tap changer 40 can pass through.

Here, the cable linking pipe 50 of the present invention is vacuum sealed from the transformer housing 10 and the tap changer housing 20. As above, it is possible to guarantee stable operation of a superconducting transformer which works at an extremely low temperature and a power tap changer such as On-Load Tap Changer which works at low temperature, by means of spatial separation of the inner of the transformer housing 10 which is at an extremely low temperature and the inner of the tap changer housing 20 which is at low temperature.

Hereafter, a coupling constitution of a transformer housing 10, a cable linking pipe 50 and a tap changer housing 20 according to the present invention is explained in detail with reference to FIGS. 2 and 3.

A transforming coupling part 12, 13 for being coupled with the cable linking pipe 50 is provided on the transforming cable passing hole 11 of the transformer housing 10. Referring to FIG. 2, the transforming coupling part 12, 13 may comprise a first extended pipe part 13 extended outward from the transforming cable passing hole 11 of the transformer housing 10, and a first coupling skirt part 12 extended outward in the radial direction from the end part of the first extended pipe part 12.

Also, a tap changing coupling part 22, 23 for being coupled with the cable linking pipe 50 is provided on the tap changing cable passing hole 21 of the tap changer housing 20, corresponding to the shape of the transforming coupling part 12, 13 of the transformer housing 10. Referring to FIG. 2, the tap changing coupling part 22, 23 may comprise a second extended pipe part 23 extended outward from the tap changing cable passing hole 21 of the tap changer housing 20 and a second coupling skirt part 22 extended outward in the radial direction from the end part of the second extended pipe part 23.

The cable linking pipe 50 may comprise a cylindrical linking pipe main body 51, a transforming connecting part 52 and a tap changing connecting part 53. The transforming connecting part 52 is provided on the one side of the linking pipe main body 51 and sealingly coupled with the transforming coupling part 12, 13 of the transformer housing 10. Here, the transforming connecting part 52 is extended outward in the radial direction from the one side end part of the linking pipe main body 51 in order to be coupled with the first coupling skirt part 12 of the transforming coupling part 12, 13.

Also, the tap changing connecting part 53 is provided on the other side of the linking pipe main body 51 and sealingly coupled with the tap changing coupling part 22, 23 of the tap changer housing 20. Here, the tap changing connecting part 53, corresponding to the shape of the transforming connecting part 52, is extended outward in the radial direction from the other side end part of the linking pipe main body 51 in order to be coupled with the second coupling skirt part 22 of the tap changing coupling part 22, 23.

Here, as shown in FIGS. 2 and 3, the superconducting power transforming apparatus according to the present invention may comprise a transforming sealing wall 54 and a tap changing sealing wall 55.

A transforming sealing wall 54 is installed between the transforming coupling part 12, 13 and the transforming connecting part 52, and seals the transformer housing 10 and the cable linking pipe 50. Here, a plurality of a first cable passing holes 54a which the transformer winding tap cable 60 pass through is formed on the transforming sealing wall 54.

And, a tap changing sealing wall 55 is installed between the tap changing coupling part 22, 23 and the tap changing connecting part 53, and seals the tap changer housing 20 and the cable linking pipe 50. Here, a plurality of a second cable passing holes 55a which the transformer winding tap cable 60 pass through is formed on the tap changing sealing wall 55, in the same manner of the transforming sealing wall 54.

According to the above constitution, the transforming coupling part 12, 13 and the transforming connecting part 52 are coupled by bolts in the state that the transforming sealing wall 54 is installed between the transforming coupling part 12, 13 and the transforming connecting part 52. Also, the tap changing coupling part 22, 23 and the tap changing connecting part 53 are coupled by bolts in the state that the tap changing sealing wall 55 is installed between the tap changing coupling part 22, 23 and the tap changing connecting part 53. So, the transformer housing 10, the cable linking pipe 50 and the tap changer housing 20 are mutually separated spatially.

Here, as shown in FIG. 3, the plurality of the first cable passing holes 54a formed on the transforming sealing wall 54 are spaced apart from each other at a predetermined distance in order to prevent an insulation breakdown between the transformer winding tap cables 60 passing through each of the first cable passing holes 54a. Also, the plurality of the second cable passing holes 55a formed on the tap changing sealing wall 55 are spaced apart from each other at a predetermined distance in order to prevent an insulation breakdown between the transformer winding tap cables 60 passing through each of the second cable passing holes 55a.

And, the transforming sealing wall 54 and the tap changing sealing wall 55 may be provided with epoxy resin which is effective in keeping the cable linking pipe 50 vacuous, and the first cable passing holes 54a and the second cable passing holes 55a are coated in epoxy resin for keeping them sealed in state that the transformer winding tap cables 60 pass through the first cable passing holes 54a of the transforming sealing wall 54 and the second cable passing holes 55a of the tap changing sealing wall 55.

In the state after the cable linking pipe 50 being coupled as above, the linking pipe main body 51 may be made vacuous by means of a vacuum pump connecting to the pump connection part formed on the cable linking pipe 50 and removing air in the linking pipe main body 51 of the cable linking pipe 50.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a superconducting power transforming apparatus, it can be applied to the field of the power transforming apparatus using the superconductor by guaranteeing stable operation of a superconducting transformer which works at an extremely low temperature and a power tap changer as like On-Load Tap Changer which works at low temperature.

The invention claimed is:
1. A superconducting power transforming apparatus comprising;
   a transformer housing having a transforming cable passing hole and filled with a liquid cooling means;
   a superconducting transformer housed in the transformer housing in a state that the superconducting transformer is immersed in the liquid cooling means;
   a tap changer housing having a tap changing cable passing hole and vacuum-sealed from outside;
   a power tap changer housed in the vacuum tap changer housing; and
   a cable linking pipe vacuum-sealed from the transformer housing and the tap changer housing, and linking the transforming cable passing hole with the tap changing passing hole in order that a transformer winding tap cable connecting the superconducting transformer and the power tap changer passes through.

2. The superconducting power transforming apparatus according to claim 1, wherein the superconducting transformer is provided with a type of a high temperature superconducting transformer; and
   wherein the liquid cooling means are provided with liquid nitrogen.

3. The superconducting power transforming apparatus according to claim 2, wherein the power tap changer is provided with a type of an On-Load Tab Changer (OLCT).

4. The superconducting power transforming apparatus according to claim 3, further comprising;
   a transforming coupling part coupled with the cable linking pipe and provided on the transforming cable passing hole of the transformer housing; and
   a tap changing coupling part coupled with the cable linking pipe and provided on the tap changing cable passing hole of the tap changer housing;
   wherein the cable linking pipe comprises
   a cylindrical linking pipe main body,
   a transforming connecting part provided on the one side of the linking pipe main body and sealingly coupled with the transforming coupling part, and
   a tap changing connecting part provided on the other side of the linking pipe main body and sealingly coupled with the tap changing coupling part.

5. The superconducting power transforming apparatus according to claim 4, further comprising;
   a transforming sealing wall installed between the transforming coupling part and the transforming connecting part, sealing the transformer housing and the cable linking pipe and having a plurality of a first cable passing holes where the transformer winding tap cable passes; and
   a tap changing sealing wall installed between the tap changing coupling part and the tap changing connecting part, sealing the tap changer housing and the cable linking pipe, and having a plurality of a second cable passing holes where the transformer winding tap cable passes.

6. The superconducting power transforming apparatus according to claim 5, wherein the plurality of the first cable passing holes is spaced apart from each other at a predetermined distance in order to prevent an insulation breakdown between the transformer winding tap cables passing through each of the first cable passing holes; and
   wherein the plurality of the second cable passing holes is spaced apart from each other at a predetermined distance in order to prevent an insulation breakdown between the transformer winding tap cables passing through each of the second cable passing holes.

7. The superconducting power transforming apparatus according to claim 5, wherein the transforming sealing wall and the tap changing sealing wall are provided with epoxy resin.

8. The superconducting power transforming apparatus according to claim 5, wherein the cable linking pipe further comprises a pump connecting part connected with a vacuum pump for making an inner of the linking pipe main body vacuous.

9. A superconducting power transforming apparatus comprising;
   a transformer housing having a transforming cable passing hole and filled with a liquid cooling means;
   a superconducting transformer housed in the transformer housing in a state that the superconducting transformer is immersed in the cooling means;
   a tap changer housing having a tap changer cable passing hole and filled with a insulating oil;
   a power tap changer housed in the tap changer housing in a state that the power tap changer is immersed in the insulating oil; and
   a cable linking pipe vacuum-sealed from the transformer housing and the tap changer housing and linking the transforming cable passing hole with the tap changing passing hole in order that a transformer winding tap cable connecting the superconducting transformer and the power tap changer can pass through.

10. The superconducting power transforming apparatus according to claim 9, wherein the superconducting transformer is provided with a type of a high temperature superconducting transformer; and
   wherein the liquid cooling means are provided with liquid nitrogen.

11. The superconducting power transforming apparatus according to claim 10, wherein the power tap changer is provided with a type of an On-Load Tab Changer (OLCT).

12. The superconducting power transforming apparatus according to claim 10, further comprising;
   a transforming coupling part coupled with the cable linking pipe and provided on the transforming cable passing hole of the transformer housing; and a tap changing coupling part coupled with the cable linking pipe and provided on the tap changing cable passing hole of the tap changer housing;

wherein the cable linking pipe comprises a cylindrical linking pipe main body, a transforming connecting part provided on the one side of the linking pipe main body and sealingly coupled with the transforming coupling part, and a tap changing connecting part provided on the other side of the linking pipe main body and sealingly coupled with the tap changing coupling part.

13. The superconducting power transforming apparatus according to claim 12, further comprising;

a transforming sealing wall installed between the transforming coupling part and the transforming connecting part, sealing the transformer housing and the cable linking pipe and having a plurality of a first cable passing holes where the transformer winding tap cable passes; and a tap changing sealing wall installed between the tap changing coupling part and the tap changing connecting part, sealing the tap changer housing and the cable linking pipe, and having a plurality of a second cable passing holes where the transformer winding tap cable passes.

14. The superconducting power transforming apparatus according to claim 13, wherein the plurality of the first cable passing holes is spaced apart from each other at a predetermined distance in order to prevent an insulation breakdown between the transformer winding tap cables passing through each of the first cable passing holes; and wherein the plurality of the second cable passing holes is spaced apart from each other at a predetermined distance in order to prevent an insulation breakdown between the transformer winding tap cables passing through each of the second cable passing holes.

15. The superconducting power transforming apparatus according to claim 13, wherein the transforming sealing wall and the tap changing sealing wall are provided with epoxy resin.

16. The superconducting power transforming apparatus according to claim 13, wherein the cable linking pipe further comprises a pump connecting part connected with a vacuum pump for making an inner of the linking pipe main body vacuous.

* * * * *